(12) United States Patent
Schliwa-Bergling et al.

(10) Patent No.: US 9,473,980 B2
(45) Date of Patent: Oct. 18, 2016

(54) SEGMENTATION AND REASSEMBLY OF WARNING MESSAGES

(71) Applicant: TELEFONAKTIEBOLAGET L M ERICSSON (PUBL), Stockholm (SE)

(72) Inventors: Paul Schliwa-Bergling, Ljungsbro (SE); Anders Molander, Linköping (SE); Claes-Göran Persson, Mjölby (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/945,563

(22) Filed: Nov. 19, 2015

(65) Prior Publication Data

US 2016/0073293 A1 Mar. 10, 2016

Related U.S. Application Data

(63) Continuation of application No. 13/140,659, filed as application No. PCT/IB2009/007788 on Dec. 16, 2009, now Pat. No. 9,198,011.

(60) Provisional application No. 61/138,216, filed on Dec. 17, 2008.

(51) Int. Cl.
*H04W 4/22* (2009.01)
*H04W 28/06* (2009.01)
(Continued)

(52) U.S. Cl.
CPC .............. *H04W 28/065* (2013.01); *H04W 4/22* (2013.01); *H04W 68/02* (2013.01); *H04W 76/007* (2013.01); *H04W 4/06* (2013.01)

(58) Field of Classification Search
CPC .............. G08B 21/0211; G08B 5/227; H04M 1/7253; H04W 4/22; H04L 12/56
See application file for complete search history.

(56) References Cited

U.S. PATENT DOCUMENTS 5,493,285 A * 2/1996 Yoshizawa ............. G08B 5/227
340/7.51
6,028,514 A * 2/2000 Lemelson .......... G08B 21/0211
128/903

(Continued)

FOREIGN PATENT DOCUMENTS

EP 0981252 A2 2/2000
WO 91/15070 A1 10/1991

(Continued)

OTHER PUBLICATIONS

Imai, Hiroshi, 2-3. Earthquake Early Warning Service for Cell Phones, Institute of Image Information and Television Engineers, vol. 62, No. 9, pp. 1374-1376, Sep. 1, 2008.

(Continued)

*Primary Examiner* — Myron K Wyche

(57) ABSTRACT

The transmission of a warning message to a mobile terminal in a mobile communication network is triggered by an emergency event. The mobile terminal is first made aware of the need to receive a warning message by reception of an emergency event notification. The warning message is divided into a plurality of message segments. Each segment is transmitted in a separate paging message over a paging channel to mobile terminals in an idle mode. Information is added to each message segment to enable the mobile terminal to discriminate between segments belonging to different warning messages.

12 Claims, 5 Drawing Sheets

(51) Int. Cl.
*H04W 76/00* (2009.01)
*H04W 68/02* (2009.01)
*H04W 4/06* (2009.01)

(56) References Cited

U.S. PATENT DOCUMENTS

| | | | |
|---|---|---|---|
| 7,995,998 | B2 | 8/2011 | Wright |
| 7,996,998 | B2 * | 8/2011 | Nakaniwa ............... G01C 15/00 33/292 |
| 2005/0080790 | A1 * | 4/2005 | Jenkins ..................... G06F 8/70 |
| 2007/0129113 | A1 * | 6/2007 | Klicpera ............. H04M 1/7253 455/567 |
| 2008/0032714 | A1 | 2/2008 | Suzuki et al. |
| 2010/0035574 | A1 | 2/2010 | Punz |
| 2010/0075625 | A1 * | 3/2010 | Wu ........................ H04W 4/22 455/404.1 |

FOREIGN PATENT DOCUMENTS

| | | |
|---|---|---|
| WO | 93/19544 A1 | 9/1993 |
| WO | 00/28750 A2 | 5/2000 |
| WO | 2007/004769 A1 | 1/2007 |
| WO | 2008/139433 | 11/2008 |
| WO | WO/2008/139433 * 11/2008 ............. H04L 12/56 |

OTHER PUBLICATIONS

NTT Docomo, Inc., TP to TS 36.331 on Visibility of ETWS related IEs at RCC and duplicate detection, 3GPP TSG RAN WG #64, R2-087357, Nov. 14, 2008.

Huawei, Duplication Detection for ETWS Reception, 3GPP TSG RAN WG 2 #64, R2-086674, Nov. 14, 2008.

NTT Docomo, Ericsson, Introduction of ETWS primary notification with duplicate detection and the ETWS Primary Notification With Security message, 3GPP TSG RAN WG2 #64, R2-087239, Nov. 14, 2008.

3rd Generation Partnership Project; Technical Specification Group Services and System Aspects; Earthquake and Tsunami Warning System Requirements and Solution (ETWS); Solution Placeholder (Release 8); 3GPP tr 23.828 V0.1.0, Jan. 1, 2008.

* cited by examiner

SEGMENTATION AND REASSEMBLY OF WARNING MESSAGES

RELATED APPLICATIONS

This application is a continuation of U.S. patent application Ser. No. 13/140,659, filed Jun. 17, 2011, which is a National Stage Entry of PCT/IB2009/007788, filed Dec. 16, 2009, which claims the benefit of U.S. Provisional Application No. 61/138,216, filed Dec. 17, 2008, entitled "Handling of segmentation of ETWS messages," all of which are incorporated by reference.

TECHNICAL FIELD

The present invention relates generally to public warning systems and, more particularly, to delivery of public warning messages via a mobile communication network.

BACKGROUND

The 3rd Generation Partnership Project (3GPP) recently added support for the Earthquake and Tsunami Warning System (ETWS) to existing wireless communication standards, including the GSM/EGPRS standards. These new changes enable subscribers to receive warning messages and other notifications in response to ETWS events. Two types of notifications are transmitted to subscribers in response to an ETWS event. A primary notification (PN) is transmitted in order to quickly inform and warn subscribers about an earthquake or tsunami that will affect the subscriber's current geographic area. The goal is to provide primary notification within four seconds of an ETWS event. The secondary notification is transmitted to provide supplementary information about the ETWS event, such as where to get assistance and where to find refuge or shelters, and how to get food or medical assistance.

In GSM/EDGE mobile networks, different methods of transmitting the primary notification message may be used, depending on the state of the mobile terminal (also known as a user terminal). For example, a mobile station in idle mode may receive the primary notification message in a paging message transmitted on a paging channel. Depending on the length of the primary notification message, the primary notification message may be segmented and inserted into two or more paging messages. Therefore, the mobile terminal needs a mechanism to identify the segments belonging to the same primary notification message and the proper order of the segments in order to reassemble the primary notification message.

Because the mobile terminal may receive the PN segments out of order, there is some risk that a mobile terminal may attempt to reassemble a PN message using PN segments from two different PN messages. This situation may occur, for example, when transmission of a first PN message is aborted and replaced by a second PN message. If the mobile terminal has not received all of the segments of the first PN message, it may try to use PN segments from the second PN message to complete the first PN message. A primary notification message reassemble from segments of different messages will not be valid and the subscriber will not be warned. Accordingly, there is a need to provide a mechanism to prevent errors during reassembly of primary notification messages to ensure that the primary notification messages are correctly received by mobile terminals in the mobile communication network.

SUMMARY

The present invention relates to the transmission of public warning message to mobile subscribers over a mobile communication network. The transmission of warning message is triggered by an emergency event. The warning message is divided into a plurality of message segments. Each segment is transmitted in a separate paging message over a paging channel. Information is added to each message segment to enable the mobile terminal to discriminate between segments belonging to different warning messages. In one exemplary embodiment, a message identifier is added to each message segment. The message identifier may comprise a single bit that changes or toggles with each new warning message. Thus, message segments belonging to the same warning message will have the same message identifier. The addition of the message identifier prevents erroneous reassembly using message segments from different warning messages. Another advantage of the message identifier is that it allows the mobile terminal to determine when a new PN message has been sent so that the acquisition process will not be triggered again after the PN message is delivered to upper layer protocols.

DETAILED DESCRIPTION

Figure 1:
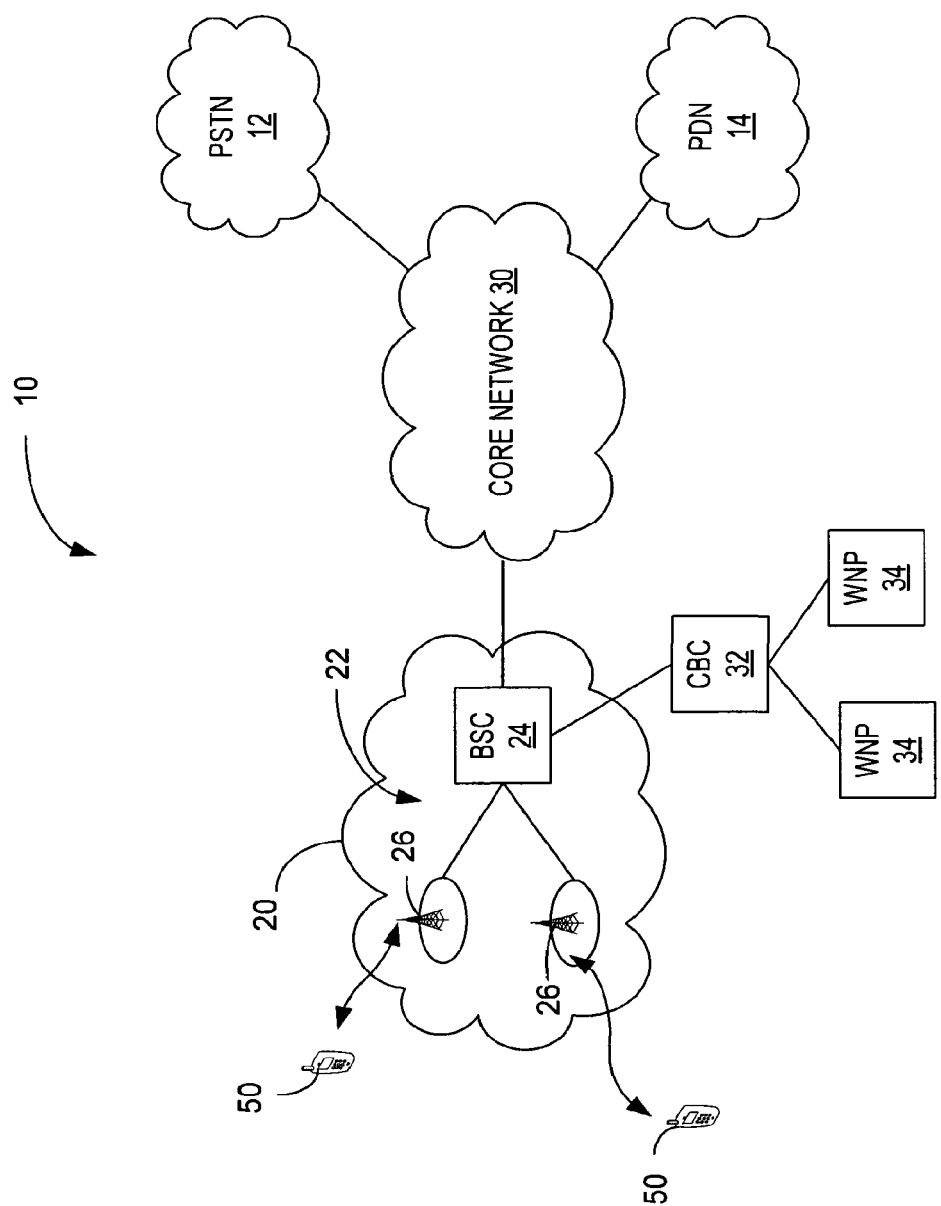
FIG. 1 illustrates an exemplary mobile communication network for transmitting warning message to mobile terminals.

Referring now to the drawings, the present invention will be described in the context of an exemplary mobile communication system 10 based on the Enhanced General Packet Radio Service (EGPRS) standard by the Third Generation Partnership Project (3GPP). The EGPRS network 10, shown in FIG. 1, comprises a GSM/EGPRS radio access network (GERAN) 20 and a core network 30. The GERAN 20 typically comprises one or more base station subsystems (BSSs) 22. For simplicity, the BSS 22 is referred to herein as a base station (BS) 22. Each BS 22 comprises a base station controller (BSC) 24 and a base transceiver station (BTS) 26, which may be co-located or in separate locations. The BTS 26 comprises the antennas, RF equipment, and baseband processing circuits needed to communicate with mobile terminals 50. The BSC 24 manages the radio resources used for communication with the mobile terminal 100 and provides a connection to the core network 30. A single BSC 24 may support multiple BTSs 26. The core network 30 connects with external networks such as the Public Switched Telephone Network (PSTN) 12 and external packet data networks 14 (e.g., the Internet), to provide both circuit-switched and packet data services.

The mobile communication network 10 may be used as a public warning system to notify subscribers of events such as hurricanes, tornadoes, tsunamis, earthquakes, floods, mudslides, etc. The 3rd Generation Partnership Project recently added support to the Global System for Mobile Communications (GSM) and Enhanced Generalized Packet Radio Service (EGPRS) standards for the Earthquake and Tsunami Warning System (ETWS). A Cell Broadcast Center (CBC) 32 receives ETWS warning requests from one or more Warning Notification Providers (WNPs) 34. In some networks, the CBC 32 may reside in the core network 30. In case of an ETWS event, the CBC initiates the broadcast of a warning message to subscribers. When the base station 22 receives a broadcast request from the CBC 32 containing a primary notification (PN) message, the base station 22 may divide the PN message into two or more segments, depending on the size of the PN message. The PN segments can be carried in two or more paging messages. In the case of a mobile terminal 50 in GSM idle mode or GPRS packet idle mode, each PN segment is transmitted in a paging message on a paging channel. When the mobile terminals 50 receive a first PN segment of a PN message, the mobile terminal 50 attempts to acquire the remaining segments of the PN message. If successful, the mobile terminal 50 reassembles the PN message from the received PN segments and alerts the user of the ETWS event.

In cases where the PN messages have been segmented, the mobile terminal 50 may receive the PN segments out of order. In GSM/EDGE systems, the first PN segment in a PN message typically contains a segment number information element indicating the total number of segments in the complete PN message. In each subsequent PN segment, the segment number information element contains a segment number in the range of 2-15. Thus, the PN message may include up to 15 segments. The transmission of ETWS warning messages in GSM/EDGE systems is described in TS 44.060 V8.5.0 and TS 44.018 v. 8.7.0.

Because the mobile terminal 50 may receive the PN segments out of order, there is some risk that a mobile terminal 50 may attempt to reassemble a PN message using PN segments from two different PN messages. This situation may occur, for example, when transmission of a first PN message is aborted and replaced by a second PN message. If the mobile terminal 50 has not received all of the segments of the first PN message, it may try to use PN segments from the second PN message to complete the PN message. For example, assume that a first PN message comprising four segments (S11, S12, S13, and S14) is in the process of being transmitted, but only S13 and S14 are received by the mobile terminal 50. Further, assume that the network 10 decides to abort the first PN message and replace it with a second PN message that also contains four segments (S21, S22, S23, and S24). In this example, there is a risk that the mobile terminal 50 will attempt to combine segments S13 and S14 of the first PN message with segments S21 and S22 of the second PN message. Because the four segments reassembled by the mobile terminal 50 belong to different primary notification messages, the PN message will be invalid and the subscriber will not receive a warning message.

According to one embodiment of the present invention, information is added to each PN segment of a PN message to enable the mobile terminal 50 to discriminate between PN segments belonging to different PN messages. In one exemplary embodiment, a PN identifier (PNI) information element is added to each PN segment. The PNI information element serves as a message identifier field to discriminate segments belonging to different PN messages. The PNI information element may comprise a single bit that changes or toggles with each new PN message. Thus, PN segments belonging to the same PN message will have the same value in the PNI information element, i.e. the same PNI. In the example given above, the mobile terminal 50 would not attempt to reassemble a PN message using segments S13, S14, S21, and S22 because segments S21 and S22 would have a PNI information element with a different value. Thus, the addition of the PNI information element prevents erroneous reassembly using PN segments from different PN messages.

Another advantage of the PN information element is that it allows the mobile terminal 50 to determine when a new PN message has been sent so that the mobile terminal acquisition process will not be triggered again after the PN message is delivered to upper layer protocols. For example, assume that the network 10 continues to broadcast a given PN message after the mobile terminal 50 has received and delivered the complete PN message to upper protocol layers. By taking note of the PNI information element value when acquiring a PN message, the mobile terminal 50 can avoid repeated acquisition of the same PN message. Repeated acquisition of the same PN message can be problematic since the mobile terminal 50 may enter a restrictive service mode while the PN message is being acquired. In the restricted service mode, the mobile terminal 50 may be unable to receive incoming calls, to originate calls, or to activate packet data services.

The PNI information element can also be used for transmitting PN messages to mobile terminals 50 in dedicated mode or packet transfer mode. In this case, the mobile terminal 50 can read an FACCH or PACCH block containing the PNI information element to determine whether the FACCH/PACCH block corresponds to a previously-received PN message. If so, the mobile terminal 50 can avoid entering the ETWS acquisition mode, which may restrict the services available to the mobile terminal.

Figure 2A:
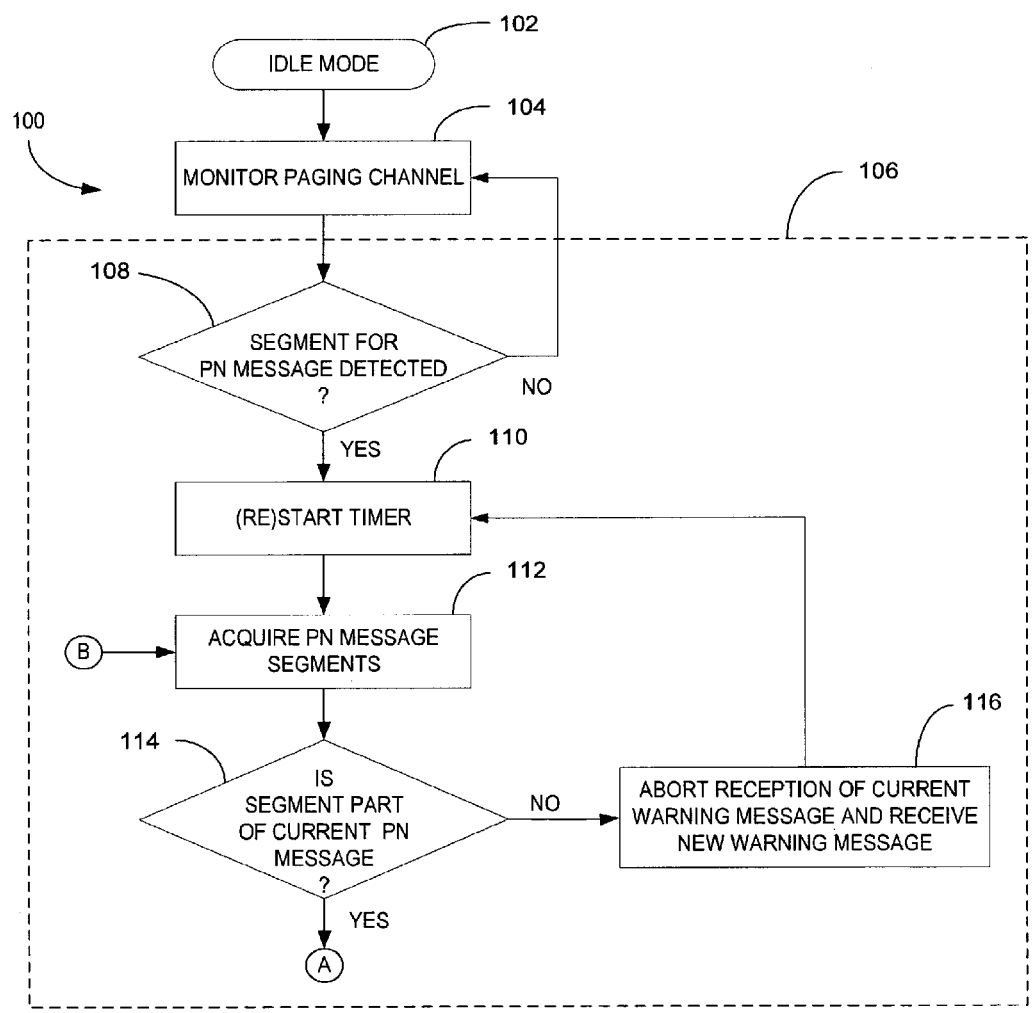
FIGS. 2A and 2B illustrate an exemplary method implemented by a mobile terminal for receiving and reassembling warning messages.
Figure 2B:
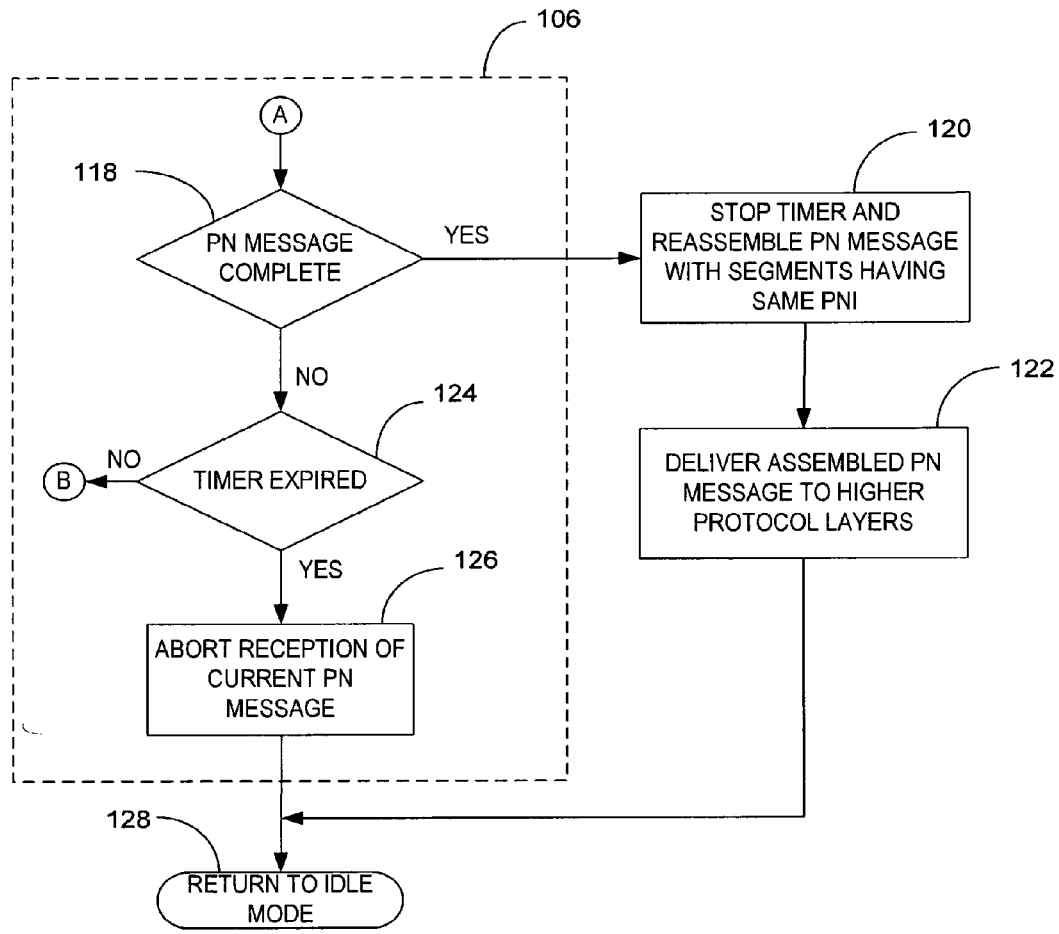

FIGS. 2A and 2B illustrate an exemplary method 100 implemented by a mobile terminal 50 for receiving warning messages (e.g., PN messages) from the network 10. The method 100 begins with the mobile terminal 50 in idle mode or packet idle mode (block 102). While in idle mode, the mobile terminal 50 monitors a paging channel for paging messages (block 104). As previously noted, the base station 22 transmits PN messages as paging messages on the paging channel when an ETWS event occurs. More particularly, the base station 22 initiates the delivery of the PN message by broadcasting the PACKET PAGING REQUEST message with the ETWS Primary Notification field present on all paging subchannels on the paging channel (PCH). These paging message are sent continuously during the ETWS warning period. Each paging message carries a segment of a PN message. Segments belonging to the same PN message will all have the same PNI value.

The acquisition of the PN message (block 106) by the mobile terminal 50 is triggered when the mobile terminal 50 detects a paging message with the ETWS Primary Notification field indicating that the paging message contains a PN segment (block 108). As previously noted, the first PN segment received may not necessarily be the first segment of the PN message. When the mobile terminal 50 detects a segment of a PN message while in idle mode, the mobile terminal 50 starts a timer (block 110) and attempts to acquire the remaining segments of the PN message (block 112). Each time a PN segment is received, the mobile terminal 50 determines whether it is part of the same PN message that triggered the acquisition process or is part of a new PN message (block 114). In cases where a segment for a new PN message is received before a prior PN message is completed, the mobile terminal 50 aborts reception of the prior PN message and begins receiving the new PN message (block 116). In this case, the mobile terminal restarts the timer (block 110) and proceeds to receive PN segments for the new PN message.

Each time a PN segment for the PN message triggering the acquisition process is received, the mobile terminal 50 determines whether it has all of the PN segments (block 118). If not, the acquisition process continues until the timer expires (block 124) If the PN message is complete, the mobile terminal 50 stops the timer and reassembles the PN message from the PN segments having the same PNI value (block 120, and delivers the PN message to higher protocol layers (block 122). If the timer expires before the warning message is complete, the mobile terminal 50 aborts reception of the warning message (block 126) and the mobile terminal returns to idle mode (block 128).

Figure 3:
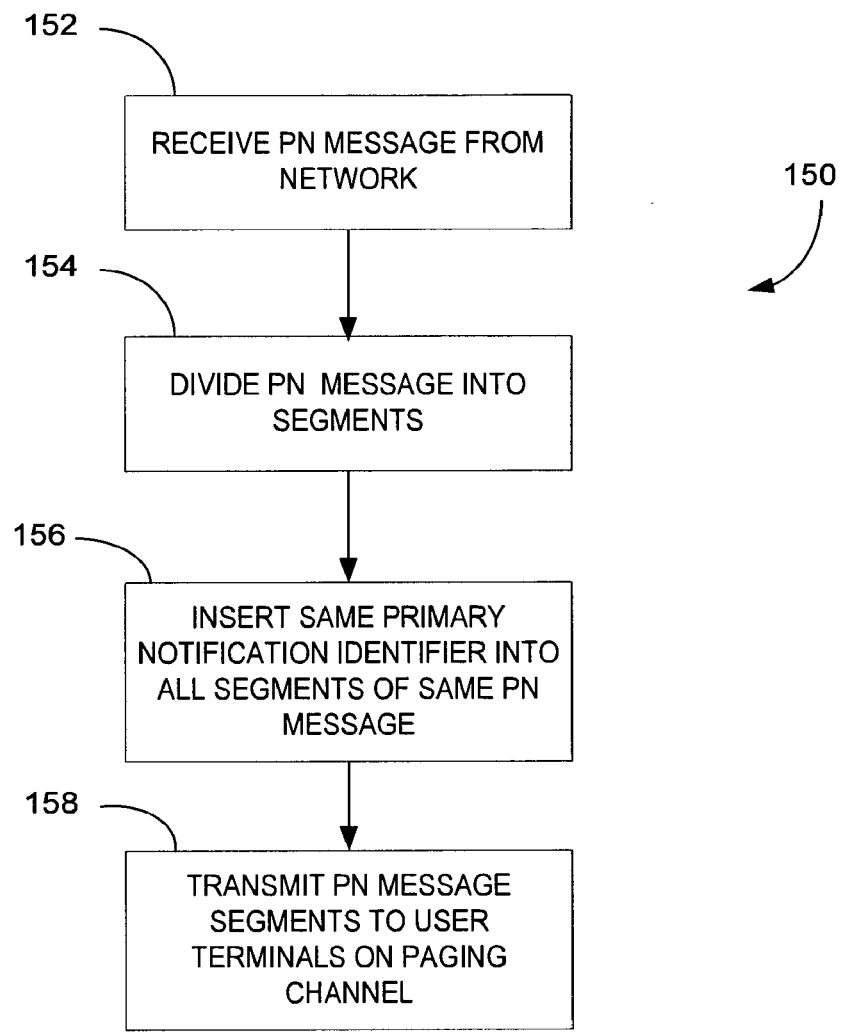
FIG. 3 illustrates an exemplary method for segmenting warning messages transmitted to mobile terminals.

FIG. 3 illustrates an exemplary procedure 150 implemented by a base station 22 for segmenting PN messages. When an emergency event occurs that triggers the ETWS public warning system, the network sends a warning message to the base station 22 (block 152). The base station 2 divides the PN message into segments, depending on the length of the PN message (block 154). The base station 22 inserts the same PNI value into each segment of the PN message (block 156) and transmits the PN message segments to the user terminals on the paging channel (block 158).

Figure 4:
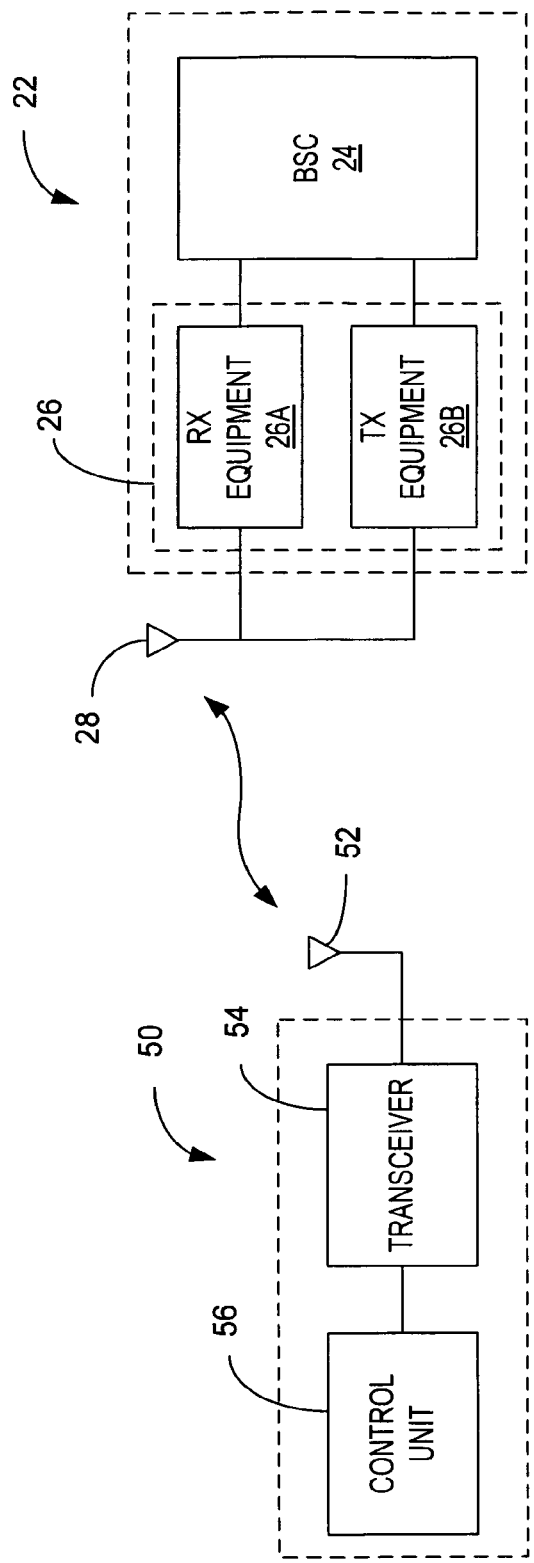
FIG. 4 illustrates an exemplary base station subsystem and mobile terminal for transmitting and receiving warning messages.

FIG. 4 illustrates an exemplary base station 22 and mobile terminal 50 for supporting the ETWS public warning system. The base station 22 comprises a base station controller 24 and a base transceiver station 26, which may be located at the same site or at different sites. The base transceiver station 26 comprises both receive equipment 26A and transmission equipment 26B, which are coupled to an antenna 28. The base station controller 24 controls the radio resources used by the base transceiver station 26 for communicating with the mobile terminals 50. The base station controller 24 and base transceiver station 26 are configured to implement a procedure for transmitting PN messages as previously described, such as the one shown in FIG. 3. The base station controller 24 may be implemented by one or more processors, hardware, or a combination thereof.

The mobile terminal 50 comprises an antenna 52, transceiver 54, and control unit 56. The transceiver 54 comprises a fully-functional cellular transceiver that operates according to any known standard. For example, the transceiver 54 may be configured to operate according to the GSM/EDGE standards. The control unit 56 processes signals transmitted and received by the transceiver 54 and provides overall operational control for the mobile terminal 50 as previously described. The control unit 56 is configured to implement a procedure for acquiring forwarding messages, such as the one shown in FIGS. 2A and 2B. The control unit 56 may be implemented in one or more processors, hardware, or a combination thereof.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. A method implemented by a user terminal of receiving warning messages, the method comprising:
    detecting a warning event while monitoring a paging channel while in idle mode;
    receiving two or more warning message segments on the paging channel, each warning message segment including a message identifier field to discriminate warning message segments belonging to different warning messages;
    detecting whether a warning message is new based on the value of the message identifier field;
    starting a timer when a new warning message is detected;
    aborting reception of a current warning message segment and returning to the idle mode, when the timer expires and if reception of all prior warning message segments having the same value in the message identifier field is incomplete; and
    reassembling the warning message from the received warning message segments having the same value in the message identifier field.

2. The method of claim 1 further comprising:
    starting the timer responsive to detection of a new warning message segment; and
    stopping the timer if all warning message segments of the warning message are received before expiration of the timer.

3. The method of claim 2 further comprising aborting reception of a prior warning message if reception of the prior warning message is incomplete when a warning message segment of a new warning message is received.

4. The method of claim 3, further comprising restarting the timer when a warning message segment for the new warning message is received and reception of the prior warning message is incomplete.

5. The method of claim 1 wherein detecting a warning event while monitoring a paging channel while in idle mode comprises detecting a paging message with an ETWS Primary Notification field indicating that the paging message contains a primary notification (PN) segment.

6. A user terminal comprising:
    a transceiver;
    a control circuit coupled to the transceiver and configured to:
    receive two or more warning message segments on the paging channel, each warning message segment including a message identifier field to discriminate warning message segments belonging to different warning messages;
    detect whether a warning message is new based on the value of the message identifier field;
    starting a timer when a new warning message is detected;
    aborting reception of a current warning message segment and returning to the idle mode, when the timer expires and if reception of all prior warning message segments having the same value in the message identifier field is incomplete; and
    reassemble the warning message from received warning message segments having the same value in the message identifier field.

7. The user terminal of claim 6 wherein the control circuit is further configured to start the timer responsive to receipt of a first warning message segment of a warning message, and to stop the timer if all warning message segments of the warning message are received before expiration of the timer.

8. The user terminal of claim 7 wherein the control circuit is further configured to abort reception of a prior warning message if reception of the prior warning message is incomplete when a new warning message segment is received.

9. The user terminal of claim 7 wherein the control circuit is further configured to restart the timer when a warning message segment for the new warning message is received and reception of the current warning message is incomplete.

10. The user terminal of claim 6 wherein the control circuit is configured to detect a warning event by detecting a paging message having a warning notification field.

11. A method in a base station in a wireless communication network for transmitting warning messages, the method comprising:
    dividing a warning message into two or more warning message segments having the same message identifier value, the message identifier value discriminating warning message segments belonging to different warning messages; and
    transmitting, in a paging channel, each warning message segment to a user terminal in an idle mode, wherein the user terminal
        detects whether a warning message is new based on the value of the message identifier field,
        starts a timer when a new warning message is detected, and
        aborts reception of a current warning message segment and returns to the idle mode, when the timer expires and if reception of the prior all warning message segments having the same value in the message identifier field is incomplete.

12. A base station in a wireless communication network for transmitting warning messages to a user terminal, said base station comprising:
    a transmitter; and
    a control unit coupled to the transmitter and configured to:
        divide the warning message into two or more warning message segments having the same message identifier value, the message identifier value discriminating warning message segments belonging to different warning messages; and
        transmit, on a paging channel, each warning message segment to the user terminal in an idle mode, wherein the user terminal
        detects whether a warning message is new based on the value of the message identifier field,
        starts a timer when a new warning message is detected; and
        aborts reception of a current warning message segment and returns to the idle mode, when the timer expires and if reception of the prior all warning message segments having the same value in the message identifier field is incomplete.

* * * * *